United States Patent
Maisonneuve et al.

(10) Patent No.: US 8,478,477 B2
(45) Date of Patent: Jul. 2, 2013

(54) METHOD OF ORGANIZING AIRCRAFT MAINTENANCE

(75) Inventors: Pierre-Loic Maisonneuve, Marseilles (FR); Mathieu Glade, Sanary sur Mer (FR); Samir Ghelam, Marseilles (FR); Patrick Lyonnet, Sainte-Croix-En-Jarez (FR)

(73) Assignee: Eurocopter, Marignane Cedex (FR)

( * ) Notice: Subject to any disclaimer, the term of this patent is extended or adjusted under 35 U.S.C. 154(b) by 1008 days.

(21) Appl. No.: 12/510,374

(22) Filed: Jul. 28, 2009

(65) Prior Publication Data

US 2010/0023209 A1  Jan. 28, 2010

(30) Foreign Application Priority Data

Jul. 28, 2008  (FR) ..................... 08/04288

(51) Int. Cl.
*G01M 17/00* (2006.01)
(52) U.S. Cl.
USPC ........................... 701/29.4; 340/945
(58) Field of Classification Search
USPC ..... 701/29.4, 33.4, 32.9, 31.6, 29.1; 340/500, 340/945
See application file for complete search history.

(56) References Cited

U.S. PATENT DOCUMENTS

| 6,370,454 | B1 | 4/2002 | Moore | |
|---|---|---|---|---|
| 7,131,136 | B2 * | 10/2006 | Monroe | ......................... 725/105 |
| 2006/0259217 | A1 * | 11/2006 | Gorinevsky et al. | ............ 701/29 |

FOREIGN PATENT DOCUMENTS

| WO | WO-0197038 | 12/2001 |
|---|---|---|
| WO | WO-2007005002 | 1/2007 |
| WO | WO-2007035790 | 3/2007 |

OTHER PUBLICATIONS

French Preliminary Search Report for French Patent Application No. 08 04288, dated May 25, 2009.

* cited by examiner

*Primary Examiner* — Thomas Black
*Assistant Examiner* — Luke Huynh
(74) *Attorney, Agent, or Firm* — Brooks Kushman P.C.

(57) ABSTRACT

A method of managing maintenance of an aircraft. The method includes defining a recommended maintenance program for the aircraft. Maintenance deadlines for the recommended maintenance program are determined by using primary data from a testing of at least one of pieces of equipment and elements of the aircraft. Utilization data for the aircraft is used and stored. A calculation device is used to implement at least one algorithm to recalculate the maintenance deadlines as a function of the actual utilization data. The recommended maintenance program is updated.

16 Claims, 1 Drawing Sheet

METHOD OF ORGANIZING AIRCRAFT MAINTENANCE

CROSS REFERENCE TO PRIOR APPLICATIONS

Priority is claimed to French Patent Application No. FR 08/04288, filed Jul. 28, 2008. The entire disclosure of said application is incorporated by reference herein.

FIELD OF THE INVENTION

The present invention relates to the general technical field of maintaining equipment and aircraft such as helicopters. The present invention also relates to planning maintenance operations and to issuing recommended maintenance programs for aircraft.

BACKGROUND OF THE INVENTION

At present, the maintenance of an aircraft is determined, for example, during its design stage. The maintenance is then described in a recommended maintenance program (RMP) in which maintenance deadlines are calculated as a function of theoretical utilization of the aircraft covering a maximum of critical behaviors. Such theoretical utilization is identical for all aircraft of a given type, regardless of how they are actually operated in practice by the purchaser.

Such a situation can lead to extra costs in terms of maintenance, in particular for aircraft that are utilized little. The real use of the client is not taken into account in known recommended maintenance programs.

WO 2007/035790 describes a maintenance system for various pieces of equipment, for example for aircraft, which system is located remotely from the pieces of equipment and receives information therefrom via wireless communication. The system includes a microprocessor and it is controlled by a program that enables a maintenance plan to be modified as a function of operating parameters (wear, failure) and of utilization parameters (environment, temperature). The system then enables the maintenance plan of other (identical) pieces of equipment used under the same conditions to be modified automatically, such as for a fleet, and enables spare parts to be ordered and delivered, where necessary, to the right place and at the right time. The objective of modifying a recommended maintenance program of an aircraft on the basis of data coming from another aircraft may constitute a drawback in terms of individualized management for said aircraft, and in particular their mechanical parts when subjected to such a recommended maintenance plan.

WO 2007/005002 describes a maintenance unit that is suitable for modifying an initial maintenance plan as a function of information coming from maintenance operations performed in accordance with that initial plan, as a function of defects or malfunctions, and as a function of the utilization conditions of the equipment under consideration. The real and actual use of the equipment, such as in the context of a calculation model such as an algorithm for dynamically calculating maintenance deadlines, is, however, not provided.

Surveillance systems on board aircraft also do not give information concerning an estimate of the wear or the damage of the parts under surveillance as time progresses.

Known recommended maintenance programs furthermore reflect firstly the increasing complexity of machines and secondly the multiplication of specific maintenance tasks. Managing maintenance is becoming more and more complicated for an operator.

SUMMARY OF THE INVENTION

An aspect of the present invention is to remedy the above-mentioned drawbacks and to propose a method of managing maintenance, making the planning of maintenance activity easier for operators.

Another aspect of the present invention is to provide a method of managing maintenance that enables account to be taken of the actual and individualized use of each aircraft.

Another aspect of the present invention proposes a method of managing maintenance that enables the remaining lifetime of the parts of an aircraft to be estimated in real time.

Another aspect of the present invention proposes a method of managing maintenance that enables the cost associated with maintaining the aircraft to be reduced.

To an embodiment, the present invention provides for a method of managing maintenance of an aircraft. The method includes defining a recommended maintenance program for the aircraft. Maintenance deadlines for the recommended maintenance program are determined by using primary data from a testing of at least one of pieces of equipment and elements of the aircraft. Utilization data for the aircraft is used and stored. A calculation device is used to implement at least one algorithm to recalculate the maintenance deadlines as a function of the actual utilization data. The recommended maintenance program is updated.

BRIEF DESCRIPTION OF THE DRAWINGS

The present invention is described in greater detail below on the basis of embodiments and of the drawings in which.

DETAILED DESCRIPTION OF THE INVENTION

Figure 1:
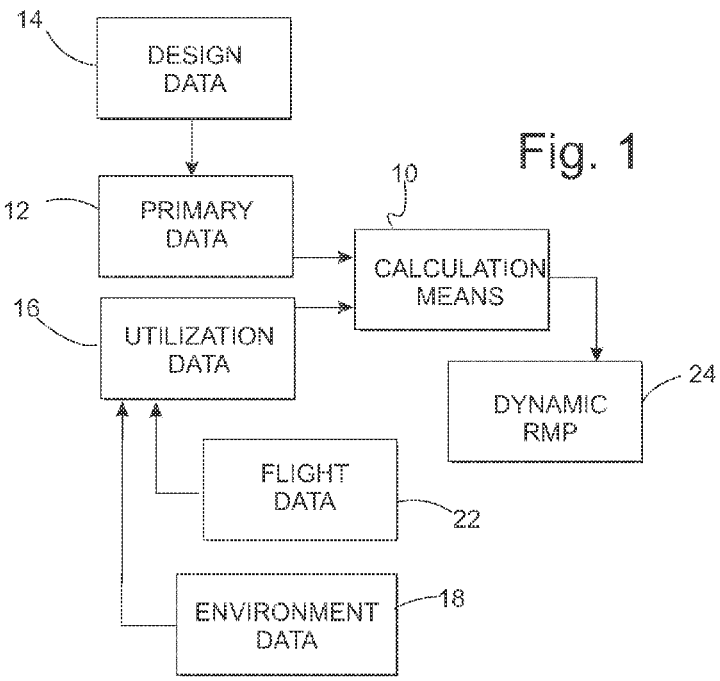
FIG. 1 is a diagram illustrating an embodiment of the method of the present invention for establishing a recommended maintenance program.

In an embodiment, the method in accordance with the present invention comprises updating the recommended maintenance program in real time or after each actual utilization of the aircraft.

In an embodiment, the method in accordance with the present invention comprises determining influential degradation parameters that are representative of modes of degradation of the aircraft and in subjecting said degradation parameters to surveillance.

In an embodiment, the method in accordance with the present invention comprises taking use data and health data stored by on-board surveillance systems of the aircraft, and utilizing it as utilization data.

By way of example, the use and health data is organized in five families comprising:

data relating to loads representing the torques and the moments applied to the mechanical elements of the aircraft;

data relating to the lubrication of mechanical parts, such as measurements of the lubricating power of oil and the degree of pollution of oil;

data relating to the environment such as weather, temperatures, pressures, and altitudes;

data relating to stages of flight, including aerodynamic forces and vibration; and experience feedback data relating to the health of an aircraft or of a fleet of aircraft.

In an embodiment, the method in accordance with the present invention comprises determining threshold values for the influential degradation parameters and in verifying during the life cycle whether these thresholds are exceeded by said parameters.

In an embodiment, the method in accordance with the present invention comprises determining maintenance credit, if any, allocated to a user as a function of conclusions from the processing of the influential degradation parameters.

In an embodiment, the method in accordance with the present invention comprises utilizing and analyzing stored use and health data in order to track the degradation modes of various elements of pieces of equipment constituting the aircraft, in particular mechanical parts, and in order to determine a level or a percentage of wear for said elements or pieces of equipment and/or in-formation relating to the potential remaining lifetime of said elements or pieces of equipment.

In an embodiment, the method in accordance with the present invention comprises tracking the degradation modes by utilizing at least one calculation model that is predefined, such as during the design of the aircraft, in order to analyze the use and health data.

In an embodiment of the present invention, the method comprises utilizing a damage calculation model and an accumulated damage calculation model concerning the mechanical parts constituting the aircraft.

In an embodiment, the method in accordance with the present invention comprises utilizing input values stored in real time and derived from use and health data in order to recalculate the wear or the damage of parts, with this being done by means of the damage calculation model.

The objects allocated to the present invention are also achieved with the help of a surveillance, calculation, and decision unit for an aircraft, such as a helicopter, and suitable for implementing the above method, the unit comprising:

a set of sensors enabling the input parameters needed for dynamically calculating maintenance deadlines to be sensed;

calculation means, such as a microcontroller, on the ground or on board for hosting one or more algorithms incorporating one or more calculation models such as algorithms for dynamically calculating deadlines;

storage means, which is, for example, connected to the microcontroller, to the sensors, and/or to other sources of information, in order to record the use and health data; and formatting means for formatting the use and health data and suitable for acting on the ground or on board to issue a recommended maintenance program that is dynamic and up to date.

In an embodiment of the present invention, the surveillance, calculation, and decision unit is associated with transmission means for transmitting the use and health data and/or the updated recommended maintenance program to at least one fixed base on the ground.

In an embodiment, the surveillance, calculation, and decision unit in accordance with the present invention comprises firstly the recording means in the form of an on-board black box, and secondly a station enabling data to be processed on the ground.

The objects allocated to the present invention are also achieved with the help of a helicopter including a surveillance, calculation, and decision unit as specified above.

The method in accordance with the present invention presents the advantage of being personalized for each aircraft and of issuing a dynamic recommended maintenance program based on the actual and real utilization of each aircraft.

The method in accordance with the present invention presents the advantage of maximizing automation of maintenance task planning by means of a dynamic recommended maintenance program that is updated as time advances as a function of the actual utilization of the aircraft.

The method in accordance with the present invention presents the advantage that it enables utilization of parts to be optimized and their potential to be increased, taking full advantage of their properties and their qualities.

Another advantage of the present invention is obtained insofar as the dynamic recommended maintenance program enables takeoff to be authorized and missions to be carried out when the damage or the wear of parts is not yet critical, even though the lifetime potential of the maintenance plan has been exceeded. The method in accordance with the present invention also makes it possible to optimize the management of the stock of spare parts.

Another advantage is obtained insofar as the dynamic recommended maintenance program makes it possible to forecast the appearance of damage to a part that is going to be worn in premature manner, such as as the result of the aircraft being utilized in some particular way. This makes it possible to require a maintenance operation for safety purposes, said maintenance operation possibly being performed before the maintenance deadline initially programmed in the recommended maintenance program.

Another advantage associated with the method in accordance with the present invention lies in a reduction in the non-availability of the aircraft for maintenance operations that are unnecessary, and consequently in a reduction in the cost of operating the aircraft, and also in the costs of operating an entire fleet.

The method in accordance with the present invention as illustrated in FIG. 1 serves to manage the maintenance of an aircraft by defining a recommended maintenance program RMP for the aircraft.

The recommended maintenance program RMP determines maintenance deadlines by using primary data 12 coming from design data 14 regarding the design of parts and flight testing of various pieces of equipment and/or elements of the aircraft.

The method of the present invention comprises using and recording actual utilization data 16 of the aircraft. This data relates to use and flight parameters including environment data 18 and flight data 22.

The method in accordance with the present invention utilizes calculation means 10 for recalculating maintenance deadlines with the help of at least one algorithm and as a function of actual utilization data, and it updates the recommended maintenance program RMP. This provides a dynamic RMP 24.

The method in accordance with the present invention comprises, for example, updating the recommended maintenance program RMP in real time or after each actual utilization of the aircraft.

The method in accordance with the present invention comprises determining influential degradation parameters representative of modes of degradation of the aircraft and in keeping said degradation parameters under surveillance by using the actual utilization data of the aircraft.

In the context of the method in accordance with the present invention, actual utilization data comprises use and health data, which is, for example, recorded by embedded surveillance systems on board the aircraft.

The use and health data may, for example, be organized in five families summarized below, comprising:

data relating to loads representing the torques and the moments applied to the mechanical elements of the aircraft;

data relating to the lubrication of mechanical parts, such as measurements of the lubricating power of oil and the degree of pollution of oil;

data relating to the environment such as weather, temperatures, pressures, and altitudes;

data relating to stages of flight, including aerodynamic forces and vibration; and experience feedback data relating to the health of an aircraft or of a fleet of aircraft.

In an embodiment, the method in accordance with the present invention comprises determining threshold values for the influential degradation parameters and in verifying over the life cycle whether these thresholds are exceeded by one or more influential degradation parameters. Observing that such thresholds are exceeded has an influence on how the dynamic recommended maintenance plan is updated.

The method in accordance with the present invention may also comprise determining maintenance credit, if any, allocated to the user as a function of conclusions drawn from the treatment of the influential degradation parameters. Maintenance operations may thus be put off without that increasing the risk of malfunction or breakdown.

The method in accordance with the present invention comprises utilizing and analyzing recorded use and health data in such a manner as to track the degradation modes of various elements or pieces of equipment making up the aircraft, in particular mechanical parts, and in such a manner as to determine a level or percentage of wear of such elements or pieces of equipment and/or information relating to the potential remaining lifetime of said elements or pieces of equipment.

The method in accordance with the present invention also comprises tracking degradation modes by making use of at least one calculation model, which might be predefined during the design of the aircraft, in order to analyze the use and health data.

For this purpose, the method uses a damage calculation model and an accumulated damage calculation model for the mechanical parts constituting the aircraft.

The method in accordance with the present invention comprises using input values recorded in real time and derived from use and health data, in order to recalculate the use or the damage of the parts by means of the damage calculation model.

The algorithms suitable for use in performing these calculation operations rely on understanding all of the modes of degradation that exist in the context of dynamic assemblies, such as, for example, in a helicopter.

The method in accordance with the present invention makes it possible to obtain and update so-called time between overhaul (TBO) durations. In order to extend these durations, the updating and calculation of the TBOs involves, for example, a plurality of algorithms. Each algorithm represents a given mode of degradation, and each part constituting the mechanical assembly subject to this mode of degradation is listed. The algorithm in question takes account of the design of the part (shape, material, clearance, surface state, etc. . . . ), its utilization (corresponding to the function it performs), and the stresses to which it is subjected (torque, lubrication, or other stress appearing in the four families listed above).

Each mode of degradation is thus conceptualized by an algorithm based on a mathematical and/or physical relationship, a threshold, an expert opinion, a statistical reliability relationship, etc.

Figure 2:
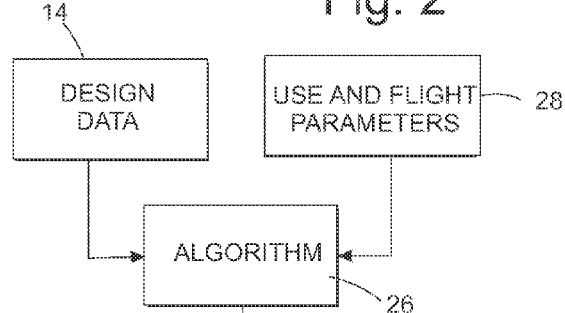
FIG. 2 is a diagram illustrating example data processing steps serving while establishing a recommended maintenance program to provide information about the residual reliability of a part or a piece of equipment.
Figure 3:
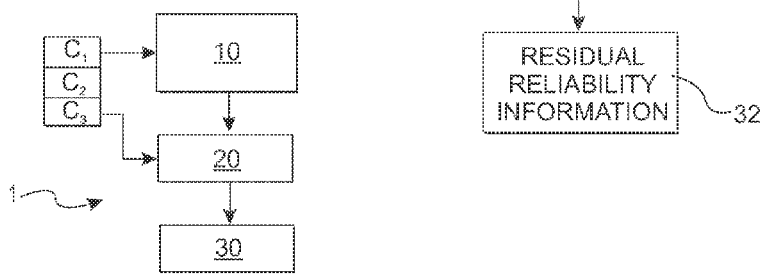
FIG. 3 is a diagram illustrating an embodiment of a surveillance, calculation, and decision unit in accordance with the present invention.

With reference, for example, to FIG. 2, it can be seen that the inputs to such an algorithm 26 are design data 14 relating to the design of the part and data 28 relating to use and flight parameters, specifically data relating to the environment external to the part and recorded in real time.

By way of example, the output 32 of such an algorithm is information concerning the volume of wear or the percentage of damage or the residual reliability corresponding to a remaining lifetime.

By way of example, the calculation means correlate a set of physical relationships that model contacts between parts, and that are known in the scientific world, in order to calculate a potential remaining lifetime and in order to deduce therefrom a new deadline or an increase in flying hours.

The algorithms may be classified in three categories, namely:

threshold-based algorithms, relying on tracking trends in one or more influential parameter correlations on the basis of the history compiled in a database, said algorithms plotting a curve over the entire history, and if the curve exceeds a given threshold, that represents wear information;

algorithms based on mechanical/physical models relying on a physical understanding of the mode of degradation, for example, the contact forces between two gearteeth are modeled using physical relationships (Hertz pressure), enabling an endurance limit for the gearing to be calculated, said algorithms relating more precisely to modeling wear beyond the endurance limit; and algorithms based on reliability statistics, making improper use of known reliability relationships for the purpose of predicting the appearance of a phenomenon or a mode of degradation, the statistical relationships thus becoming dynamic as a function of parameters that are recorded continuously (Weibull and Cox's law, for example).

The present invention also relates to a monitoring, calculation, and decision unit 1 for an aircraft, such as a helicopter, and implementing the method in accordance with the present invention.

The monitoring, calculation, and decision unit 1 in accordance with the present invention comprises a set of sensors C1, C2, and C3 serving to sense the input parameters needed for dynamically calculating maintenance deadlines.

The surveillance, calculation, and decision unit 1 also includes calculator means 10 such as a microcontroller, for storing on the ground or on board one or more algorithms incorporating one or more calculation models such as algorithms for dynamically calculating deadlines.

The surveillance, calculation, and decision unit 1 also includes storage means 20, which is, for example, connected to the microcontroller, to the sensors C1, C2, and C3, and/or to other sources of information for storing use and health data.

The surveillance, calculation, and decision unit 1 also includes formatting means 30 for formatting use and health data and suitable for outputting oil the ground or on board a recommended maintenance program RMP that is dynamic and up-to-date.

The formatting means 30 may, for example, be incorporated in a data processor station on the ground. The formatting means 30 may also be on board.

The surveillance, calculation, and decision unit 1 in accordance with the present invention may, for example, be associated with communications or transmission means for transmitting the use and health data and/or the updated recommended maintenance program RMP to at least one fixed base on the ground and/or to the client operating the aircraft. This transmission may take via an Internet gateway. Transmission via a wireless connection of the use and health data of the aircraft to the formatting means or to the calculation means on the ground may also be envisaged.

By way of example, the data may be stored in a memory internal to the aircraft while in flight, and then downloaded into means on the ground when the aircraft is at rest using communication means such as a memory card, a wireless connection, etc.

This raw or partially or completely formatted data is subsequently analyzed and added to a database that brings together all of the data downloads that have taken place since the aircraft was put into service.

The surveillance, calculation. and decision unit 1 comprises, for example: firstly in the form of an on-board black box, the storage means and the sensors C1, C2, and C3; and secondly a data processor station on the ground or a server.

The present invention is also capable of being subjected to numerous variations as to its implementation. Although several embodiments are described, it will readily be understood that it is not conceivable to identify exhaustively all possible embodiments. It is naturally possible to envisage replacing any of the means described by equivalent means or any of the steps described by an equivalent step, without going the beyond the ambit of the present invention. The present invention is therefore not limited to embodiments described herein; reference should be had to the appended claims.

What is claimed is:

1. A method of managing maintenance of a helicopter, the helicopter having on board equipment to be maintained, a calculation device having a microcontroller and a storage device for hosting algorithms, a plurality of sensors configured to provide health and use parameter values of the equipment to be maintained, a recommended maintenance program (RMP) defining maintenance deadlines calculated from primary data of design of the equipment to be maintained and of flight testing of the helicopter, the method comprising:
    defining a dynamic recommended maintenance program for the helicopter by
        using and storing in the storage device actual utilization data calculated from the health and use parameter values for the helicopter;
        using the calculation device to recalculate the maintenance deadlines as a function of the actual utilization data; and
    updating in real time the dynamic recommended maintenance program by determining influential degradation parameters representative of modes of degradation of the equipment to be maintained;
    wherein the actual utilization data includes five families including load data, lubrication data, environmental data, flight stage data, and experience feedback data;
    wherein the load data includes torques and moments applied to mechanical elements of the helicopter, the lubrication data includes lubrication of mechanical parts, measurements of a lubricating power of oil and a degree of pollution of oil, the environmental data includes weather, temperatures, pressures, and altitudes, the flight stage data includes stages of flight, aerodynamic forces, and vibration, and the experience feedback data includes a health of another helicopter including the same equipment to be maintained.

2. The method as recited in claim 1, further comprising: determining threshold values for the influential degradation parameters; and
    determining during a life cycle whether the influential degradation parameters exceed the threshold values.

3. The method as recited in claim 1, further comprising: processing the influential degradation parameters; and determining a maintenance credit.

4. The method as recited in claim 1, further comprising: utilizing and analyzing the at least one of health data and use data so as to track at least one of degradation modes of elements of the equipment of the helicopter and to determine at least one of a level of a wear for the elements of the equipment, a percentage of wear for the elements of the equipment and information on the potential remaining lifetime of the elements of the equipment.

5. The method as recited in claim 1, wherein the degradation modes are tracked with at least one predefined calculation model.

6. The method as recited in claim 5, wherein the predefined calculation model is determined during a design of the helicopter.

7. The method as recited in claim 5, wherein the degradation modes are tracked with at least one of a damage calculation and an accumulated damage calculation model of mechanical parts of the helicopter.

8. The method as recited in claim 7, wherein the damage calculation model further comprises imputing values stored in real time and derived from the at least one of health data and use data so as to recalculate at least one of a wear to and a damage of the mechanical parts of the helicopter.

9. A managing maintenance unit for surveillance, calculation and decision for maintenance of a helicopter to implement a method of managing maintenance of the helicopter, wherein the unit comprises:
    at least one sensor configured to obtain actual utilization data for the helicopter;
    a calculation device configured on at least one of the ground and on board the helicopter, the calculation device further configured to obtain a recommended maintenance program including maintenance deadlines for the helicopter, to determine influential degradation parameters representative of modes of degradation of at least one of pieces of equipment and elements of the helicopter, to subject the influential degradation parameters to surveillance by using the actual utilization data and to determine during a life cycle whether the influential degradation parameters exceed threshold values, and to host at least one algorithm incorporating at least one calculation model configured to dynamically recalculate the maintenance deadlines as a function of the actual utilization data and whether the influential degradation parameters exceed the threshold values;
    a storage device configured to record the actual utilization data; and
    a formatting device configured to act on at least one of the ground and on board the helicopter to update the recommended maintenance program according to the recalculated maintenance deadlines and to issue a dynamic and current recommended maintenance program (RMP) by including the recalculated maintenance deadlines, wherein the updating of the recommended maintenance program is performed by the formatting device in at least one of in real time and after each use of the helicopter.

10. The unit recited in claim 9, wherein
    the calculation device is a microcontroller; and
    the storage device is disposed on at least one of a microcontroller, the at least one sensor and other sources of information.

11. The unit as recited in claim 9, wherein the unit is associated with a transmission device configured to transmit at least one of the use data, the health data and the updated dynamic recommended maintenance program (RMP) to at least one fixed base on the ground.

12. The unit as recited in claim 9, wherein the unit includes a recording device in a form of an on-board black box in the helicopter and a station enabling data to be processed on the ground.

13. A method of managing maintenance of a helicopter, the method comprising:
- defining a recommended maintenance program for the helicopter;
- determining maintenance deadlines for the recommended maintenance program by using primary data from a testing of at least one of pieces of equipment and elements of the helicopter;
- obtaining actual utilization data for the helicopter using a sensor and storing the actual utilization data for the helicopter in a storage device connected to the sensor;
- determining influential degradation parameters representative of modes of degradation of the at least one of pieces of equipment and elements of the helicopter;
- subjecting the influential degradation parameters to surveillance by using the actual utilization data;
- determining threshold values for the influential degradation parameters;
- determining during a life cycle whether the influential degradation parameters exceed the threshold values;
- using a calculation device configured on at least one of the ground and on board the helicopter to implement at least one algorithm to recalculate the maintenance deadlines as a function of the actual utilization data and whether the influential degradation parameters exceed the threshold values; and
- updating the recommended maintenance program according to the recalculated maintenance deadlines using a formatting device, wherein the updating of the recommended maintenance program is performed by the formatting device in at least one of in real time and after each use of the helicopter.

14. The method as recited in claim 13, wherein the testing includes at least one of a design testing and a flight testing.

15. The method as recited in claim 13, wherein the actual utilization data includes at least one of use data and health data stored by an on-board surveillance system of the helicopter.

16. The method as recited in claim 15, further comprising:
- utilizing and analyzing the at least one of health data and use data so as to track at least one of degradation modes of elements of the pieces of equipment of the helicopter and to determine at least one of a level of a wear for the elements of the pieces of equipment, a percentage of wear for the elements of the pieces of equipment and information on the potential remaining lifetime of the elements of the pieces of equipment.

* * * * *